United States Patent
Lee et al.

(10) Patent No.: US 9,352,331 B1
(45) Date of Patent: May 31, 2016

(54) FILTERS FOR PARAMAGNETIC AND DIAMAGNETIC SUBSTANCES

(71) Applicants: Maw-Tien Lee, Chia-Yi (TW); Fu-Ming Lee, Katy, TX (US); Zih-Yao Shen, Pingtung (TW); Shou-Ming Lee, Taipei (TW); Ray-Lung Lin, Chia-Yi (TW); Chun-Lung Wu, Taichung (TW); Wei-Chih Hung, Taipei (TW)

(72) Inventors: Maw-Tien Lee, Chia-Yi (TW); Fu-Ming Lee, Katy, TX (US); Zih-Yao Shen, Pingtung (TW); Shou-Ming Lee, Taipei (TW); Ray-Lung Lin, Chia-Yi (TW); Chun-Lung Wu, Taichung (TW); Wei-Chih Hung, Taipei (TW)

(73) Assignee: ALLNEW Chemical Technology Company, Taipei (TW)

( * ) Notice: Subject to any disclaimer, the term of this patent is extended or adjusted under 35 U.S.C. 154(b) by 0 days.

(21) Appl. No.: 14/866,936

(22) Filed: Sep. 26, 2015

(51) Int. Cl.
*B03C 1/02* (2006.01)
*B01D 35/06* (2006.01)
*C02F 1/48* (2006.01)

(52) U.S. Cl.
CPC . *B03C 1/02* (2013.01); *B01D 35/06* (2013.01); *C02F 1/482* (2013.01); *B03C 2201/18* (2013.01)

(58) Field of Classification Search
CPC ...... B03C 1/02; B03C 2201/18; B01D 35/06; C02F 1/482
See application file for complete search history.

(56) References Cited

U.S. PATENT DOCUMENTS

| | | | |
|---|---|---|---|
| 2,789,655 | A | 4/1957 | Michael et al. |
| 3,139,403 | A | 6/1964 | Cramer et al. |
| 4,722,788 | A | 2/1988 | Nakamura |
| 4,946,589 | A | 8/1990 | Hayes |
| 5,043,063 | A | 8/1991 | Latimer |
| 5,427,249 | A | 6/1995 | Schaaf |
| 5,470,466 | A | 11/1995 | Schaaf |
| 5,819,949 | A | 10/1998 | Schaaf et al. |
| 6,056,879 | A | 5/2000 | Schaaf et al. |
| 6,077,333 | A | 6/2000 | Wolfs |
| 6,355,176 | B1 | 3/2002 | Schaaf et al. |
| 6,730,217 | B2 | 5/2004 | Schaaf et al. |
| 8,506,820 | B2 | 8/2013 | Yen et al. |
| 8,636,907 | B1 | 1/2014 | Lin et al. |
| 8,900,449 | B2 | 12/2014 | Lin et al. |
| 9,080,112 | B2 | 7/2015 | Yen et al. |

OTHER PUBLICATIONS

Erb et al, Magnetic assembly of colloidal superstructures with multipole symmetry, Nature, vol. 457, Feb. 19, 2009, Macmillan Publishers Limited.

*Primary Examiner* — David A Reifsnyder
(74) *Attorney, Agent, or Firm* — Charles H Jew

(57) ABSTRACT

A high capacity magnetic filter separates diamagnetic and/or paramagnetic substances from fluid streams. Diamagnetic solid substances are magnetized under an external magnetic field through coordinated interaction of diamagnetic solid substances with an inducement paramagnetic material (IPM). The magnetic filter serves as a separation zone created by the presence of IPM and magnets that are shielded from the IPM by non-magnetic sleeves or partitions. The IPM in the void volume between the magnets affords large surface area onto which diamagnetic and paramagnetic materials can contact and be attracted to. The relative position and distance of the magnetic source, such a magnetic bar or electromagnet, to the solid mixture of diamagnetic and IPM are adjusted to induce sufficiently strong magnetism in the diamagnetic solids which causes the diamagnetic solids to be attracted by the magnetic field as well. Both diamagnetic and paramagnetic substances can be removed from a liquid or gas.

34 Claims, 4 Drawing Sheets

FILTERS FOR PARAMAGNETIC AND DIAMAGNETIC SUBSTANCES

FIELD OF THE INVENTION

The present invention relates to robust, high capacity magnetic filters for removing paramagnetic and/or diamagnetic materials from gas and liquid streams.

BACKGROUND OF THE INVENTION

Paramagnetic substances can be magnetized under an external magnetic field. Paramagnetic materials include, for example, manganese, chromium, cerium, iron, cobalt, potassium, vanadium, and their oxides or sulfides. Without influence of the external magnetic field, the magnetic dipole in a paramagnetic molecule points in random directions, so it has zero magnetism. As a suitable external magnetic field is applied, a paramagnetic substance is magnetized since the number of magnetic dipoles aligned parallel toward the direction of the magnetic field is more than those aligned away from the field.

Conventional magnetic filters remove paramagnetic substances or particles from gas or liquid fluids through the influence of an external magnetic field generated by permanent magnetic or electromagnetic sources. For example, magnetic filters disclosed in U.S. Pat. No. 8,506,820 to Yen et al, U.S. Pat. No. 8,636,907 to Lin et al, and U.S. Pat. Nos. 8,900,449 and 9,080,112 both to Yen et al, can remove paramagnetic particles from liquid streams in refinery and chemical facilities. The paramagnetic particles which include FeS, FeO, $Fe(OH)_2$, $Fe(CN)_6$, etc. are formed when carbon steel, which is a common material in plant construction, corrodes in the presence of acidic contaminants in the process stream to yield ferrous ions, which react with sulfur, oxygen and water. These paramagnetic contaminants tend to adhere to magnets.

Diamagnetic substances contain pairs of magnetic dipoles which tend to cancel out the magnetism internally. Diamagnetic materials include, for example, carbon (diamond), carbon (graphite), silica, alumina, bismuth, phosphorous, mercury, zinc, lead, tin, copper, silver, gold, water, ethyl alcohol, etc. In the presence of an external magnetic field, the magnetic dipoles of diamagnetic substances align parallel and in reverse direction to the magnetic field and therefore exhibit no magnetism. Prior art magnetic filters cannot remove diamagnetic substances.

Filtration with mesh screens and the like is the standard employed to separate diamagnetic particles from gas or liquid fluids but this technique is not efficient for small particles. For example, nano carbon particles such as particulate matter PM 2.5 emitted from power plants, steel mills, and mobile sources including cars and motorcycles cannot be effectively abated. Similarly, nano particles in the form of catalyst fines, steel rust, carbon residue or polymerized slurry found in refinery and chemical plants cannot be effectively filtered. Solid particles comprising FeS, FeO, sand, carbon residue, etc. of various sizes are also present in natural gas processes. Paramagnetic and diamagnetic materials are major constituents of both natural and industrial pollutants and contaminants.

It is highly desirable to develop systems for removing both of paramagnetic and diamagnetic particles, or at least the diamagnetic particles, of all sizes from the gas and liquid fluids.

SUMMARY OF THE INVENTION

The present invention is based in part on the demonstration that common diamagnetic solid substances can be magnetized under an external magnetic field through coordinated interaction of the diamagnetic solid substances with an inducing or inducement paramagnetic material (IPM). The IPM which is solid should preferably not be in direct contact with the magnet which generates the external magnetic field. On the other hand, the diamagnetic solid substance preferably is in direct contact with the IPM or is uniformly mixed with the IPM. The position and distance of a magnetic source, such a magnetic bar or electromagnet, to the solid mixture of diamagnetic and IPM are adjusted and maintained so as induce sufficiently strong magnetism in the diamagnetic solids which causes the diamagnetic solids to be attracted by the magnetic field as well. In this fashion, both diamagnetic and paramagnetic substances can be removed from a liquid or gaseous stream in which the solid mixture is entrained or fluidized. Not all paramagnetic substances can induce magnetism in diamagnetic solid substances in the presence of an external magnetic field in the magnetic filters of the present invention. Thus, "inducement paramagnetic material" or "IPM" refers to solid paramagnetic material that can cause diamagnetic solid materials to exhibit sufficient magnetism to be attracted by a magnetic field and be removed or captured with the magnetic filter of the present invention.

Accordingly, in one aspect, the invention is directed to a method of removing diamagnetic material from a carrier stream that includes the steps of:

contacting a carrier stream comprising a carrier fluid and a diamagnetic material to an inducement paramagnetic material within a region; and establishing a magnetic field within the region thereby rendering the diamagnetic material sufficiently magnetic so as to be attracted by a magnet to a yield a cleaned carrier fluid with reduced levels of the diamagnetic material.

In another aspect, the invention is directed to a magnetic filter for separating diamagnetic contaminants from a carrier stream that includes:

a housing having (i) a stream inlet, (ii) a stream outlet and (iii) an interior region between the inlet and outlet;

inducement paramagnetic material (IPM) distributed within the interior region wherein the IPM is configured to come into physical contact with the diamagnetic contaminants; and a magnet disposed within the interior region to generate a magnetic field sufficient to render the IPM magnetic.

The magnetic filter serves as a robust separation zone created by the presence of IPM and magnets that are shielded from the IPM by non-magnetic partitions. Preferably, elongated magnet assemblies are employed to generate a uniform magnetic field in the separation zone. The elongated magnet assemblies can be arranged in parallel or traverse to the fluid flow within the filter. The IPM in the void volume or space between the magnets afford a large surface area onto which diamagnetic and paramagnetic materials in the fluid steam can contact and be attracted to. While the invention will be described using permanent magnets to establish the magnetic field, it is understood that electromagnets can be employed.

DESCRIPTION OF THE PREFERRED EMBODIMENTS

Figure 1A:
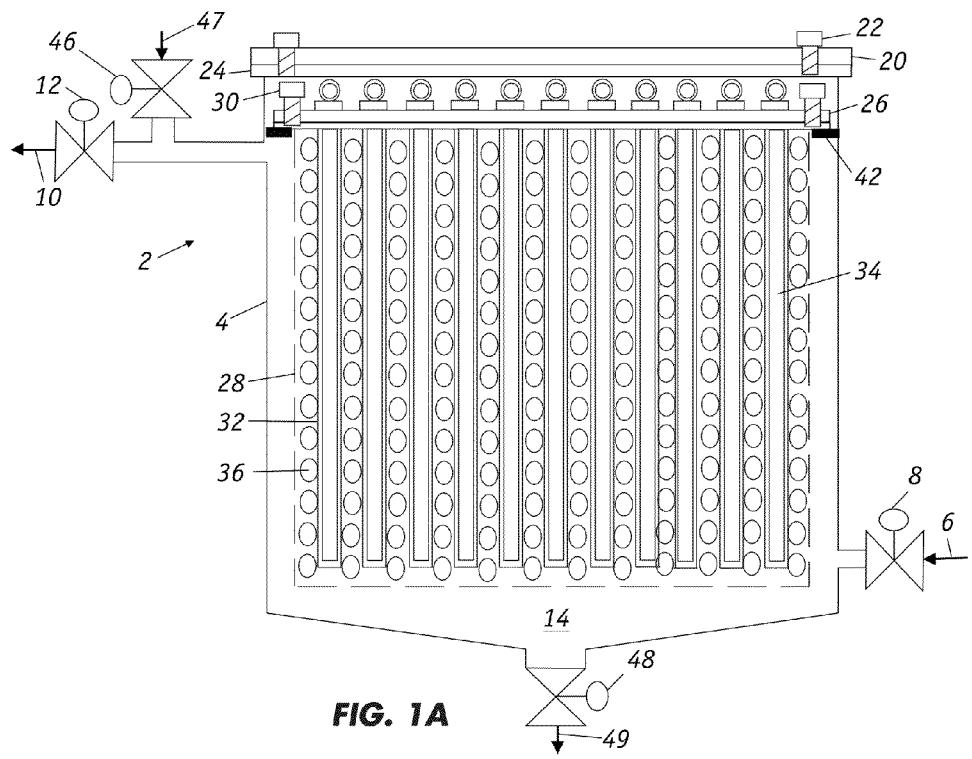
FIG. 1A and FIG. 1B are elevational cross sectional and top views, respectively, of an embodiment of a magnetic filter with inducement paramagnetic material packing and removable, vertically oriented permanent magnetic bar assemblies, with FIG. 1B depicting the magnetic filter with the cover plate off and illustrating a limited number of sleeve holders and packing material.

FIG. 1A depicts the schematic configuration of a vertical filter 2 that comprises a housing 4 having an inlet pipe 6 that can be coupled to a contaminated process stream through control valve 8, an outlet pipe 10 from which a treated process stream exits through control valve 12. Housing 4 defines an interior region 14. Flow through drain pipe 49, which is welded to the bottom of housing 4, is regulated with control valve 48 which is normally closed during filtration operations but which is opened during clean-up service to discharge flush fluid from housing 4. The size of the opening in drain pipe 49 is sufficient to accommodate large particles that accumulate in the filtration process.

A cover plate 20 is fastened by bolts 22 to an annular flange 24 that is welded to the outer perimeter along the top opening in housing 4. A polymer gasket or other suitable sealing means may be inserted between cover plate 20 and flange 24 to insure a tight seal during the operation cycle. A top supporting plate 26, which is fastened to the top rim of wire cage 28 around the perimeter by bolts 30, facilitates the removal of the entire core assembly from filter housing 4 during the clean-up cycle. Both the top supporting plate 26 and the top rim of wire cage 28 are placed on a supporting ring 42 which is permanently connected to filter housing 4. The weight of the core assembly causes top supporting plate 26 and the top rim of wire cage 28 to press tightly against supporting ring 42 to prevent the open end of each holder sleeve 32 and, thus magnetic bar assemblies 34, from coming in contact with the process fluid during the filtration process.

The core assembly includes multiple, vertically oriented removable permanent magnetic bar assemblies 34 with each being fitted into an elongated diamagnetic sleeve holder 32, IPM packing elements or substances 36 which fill up the space in between the sleeve holders 32 as the magnetic inducing media for solid diamagnetic substances in the process stream. Wire cage 28, as a holder of IPM packing 36, is preferably made of coarse wire of diamagnetic substances, such as stainless steel, with mesh size slightly smaller than the size of IPM packing substance 36 to prevent their loss to the process flow.

Preferably the IPM packing elements 36 are in layered arrangement with the largest ones on top and the smallest ones at the bottom. This gradient packing matrix configuration enables the magnetic filter to capture diamagnetic and paramagnetic substances of different sizes without causing significant pressure drops and throughput reductions.

The IPM is preferably formed of materials with high and positive mass susceptibility. Suitable IPM include, for example, Ce, $CeO_2$, $CsO_2$, Co, CoO, Ni, CuO, NiO, NiS, Fe, FeO, $Fe_2O_3$, FeS, Mn, $Ni/\gamma Al_2O_3$, $Cr_2O_3$, $Dy_2O_3$, $Gd_2O_3$, Ti, V, $V_2O_3$, Pd, Pt, Rh, $Rh_2O_3$, $KO_2$, and mixtures thereof with Co, CoO, Ni, Fe, FeO, $Fe_2O_3$, FeS, $Ni/\gamma Al_2O_3$, $Cr_2O_3$, $Dy_2O_3$, and $Gd_2O_3$ being particularly preferred. Preferred configurations of the IPM packing elements include but not limited to conventional random packing such as rings, saddles, chips, and wires, structure packings, and macro-pore catalyst supports, such as guard-bed materials used in a fixed-bed reactor.

It is critical to keep the distance between the adjacent vertically oriented magnetic bar assembles 34 sufficiently close so that the IPM substances, which are packed in the filter, can induce sufficient magnetism to attract the diamagnetic substances from the process stream. The distance, which is measured from exterior surfaces of adjacent sleeve holders 32, should be from 0.1 to 5 cm and preferably from 0.1 to 2 cm. The magnetic flux intensity within the interior region 14 in magnetic filter 2 should be from 2,000 to 20,000 GS, and preferably from 2,000 to 10,000 GS, and most preferably from 6,000 to 10,000 GS.

Each sleeve holder 32, which is highly permeable to magnetic fields, has a sealed bottom and an open top end which is preferably welded at its perimeter to the fitted hole at the top supporting plate 26. This prevents the open end of each holder sleeve 32 and the associated magnetic bar assembly 34 from coming into direct contact with the process fluid during filtration. Top supporting plate 26 bears the weight of the plurality of permanent magnetic bar assemblies 34 with their associated holder sleeves 32, the IPM packing substances 36, and wire cage 28.

Figure 1B:
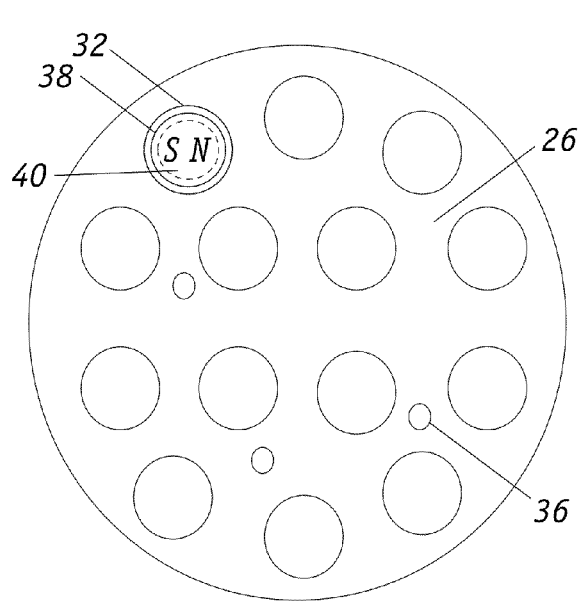

FIG. 1B depicts the top view showing the top supporting plate 26 with its fitted holes for the sleeve holder 32, and the IPM packing substance 36 which fills up the space between the sleeve holders 32. One of sleeve holders 32 has a permanent magnetic bar assembly inserted therein with casing 38 enclosing a magnet block 40. Casing 38 is permeable to magnetic fields.

Figure 1C:
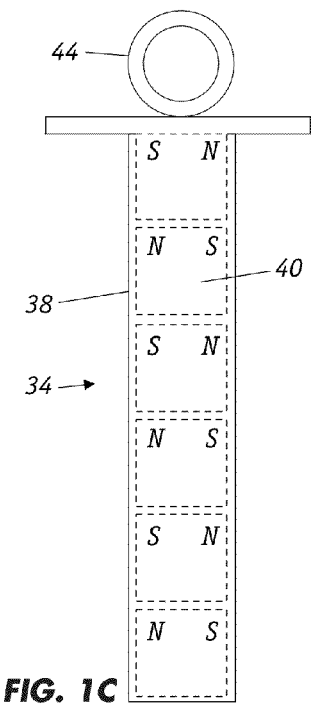
FIG. 1C is a cross sectional view of a permanent magnetic bar assembly.

FIG. 1C depicts the vertical cross sectional view of a permanent magnetic bar assembly 34 that includes an elongated casing 38 that is preferably made of a diamagnetic metal such as stainless steel and defines a chamber that accommodates one or more encased magnet blocks 40. Each magnetic bar assembly 34 has a pulling ring 44 for withdrawing it from sleeve holder 32. A plurality of short magnet blocks or cylinders 40 are stacked one on top of another and arranged so that each of the two poles of one magnet block is juxtaposed to an opposite pole of an adjacent magnet block. In this staggered arrangement, the axis of each elongated magnet block 40 is perpendicular to the central axis along the length of assembly 34.

Figure 1D:
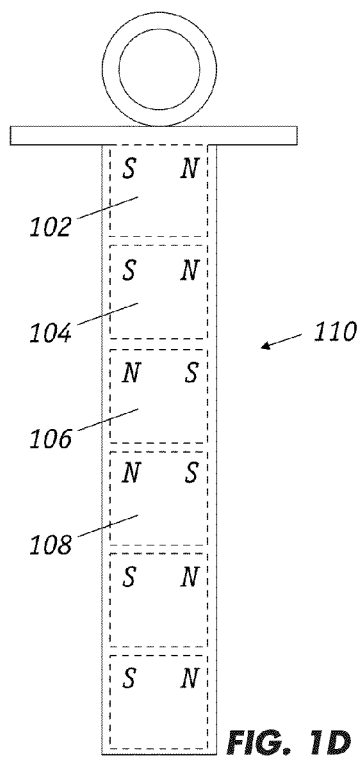
FIG. 1D is a cross sectional view of an alternative permanent magnetic bar assembly.

FIG. 1D illustrates a permanent magnetic bar assembly 110 where two adjacent pairs of blocks 102,104 having like poles pointing in the same first direction form a magnet block unit or array that is stacked over another magnet block unit, consisting of blocks 106,108 having like poles pointing in a second direction, which is opposite the first direction. The assembly 110 has a succession of such block units with opposite pole configurations. As is apparent, each magnet block unit or array can comprise more than 2 magnet blocks or cylinders.

In use, each permanent magnetic bar assembly 34 or 110 is supported within a sleeve holder 32. It has been observed that the magnetic flux density of these encased permanent magnets as measured by a Tesla meter was essentially the same with or without a 304SSL sleeve. That is, the presence of the diamagnetic barrier (sleeve holder) did not result in a significant decay of the magnetic flux density. In contrast, permanent magnetic bar assemblies consisting of a plurality of magnet blocks that are arranged in tandem as shown in FIG. 1E exhibited a significant decrease in magnetic flux density when a 304SSL sleeve was used.

Figure 1E:
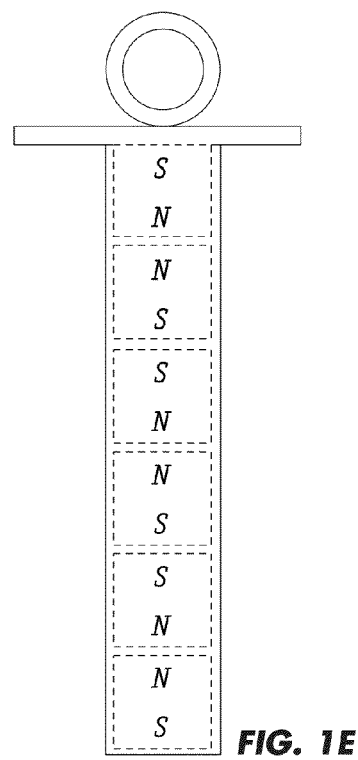
FIG. 1E is a cross sectional view of a permanent magnetic bar assembly.
Figure 3A:
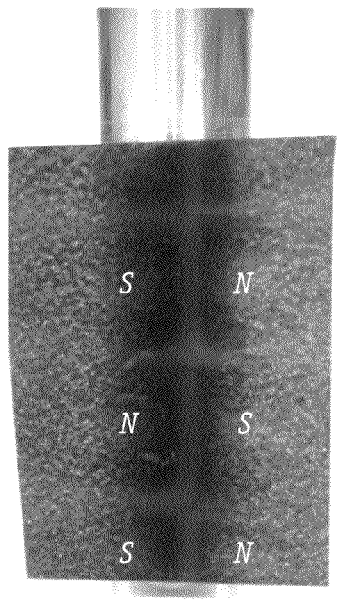
FIGS. 3A and 3B are photographic images of the magnet pole locations in the permanent magnetic bar assemblies.
Figure 3B:
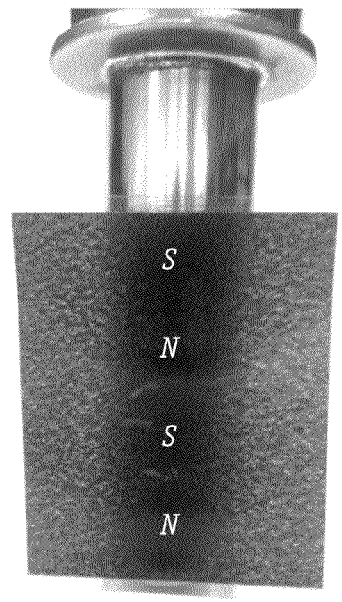

It has also been observed that diamagnetic and paramagnetic particles are not attracted to the entire surface of the magnetic bar assembly as shown in FIG. 1E but rather such particles form bands around the exterior surfaces. To reveal the arrangement of the magnet blocks in the magnetic bar assembly, Magnetic Viewer Cards were placed in front of both of the magnetic bar assemblies shown in FIGS. 1C and 1E. The Magnetic Viewer Card is a flexible film containing liquid magnetic power. FIGS. 3A and 3B show images that are created through polar induction by the magnetic field of the magnets. The images of the magnetic poles in each assembly can be seen through the card, where the light areas represent the junctions where N and S poles meet and the locations are quantitatively measured.

Figure 4A:
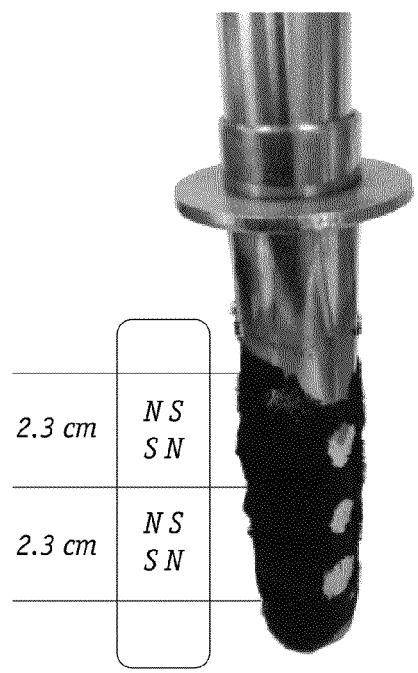
FIGS. 4A and 4B are photographic images of the paramagnetic powders attracted to exterior surfaces of the associated sleeves of the permanent magnetic bar assemblies.
Figure 4B:
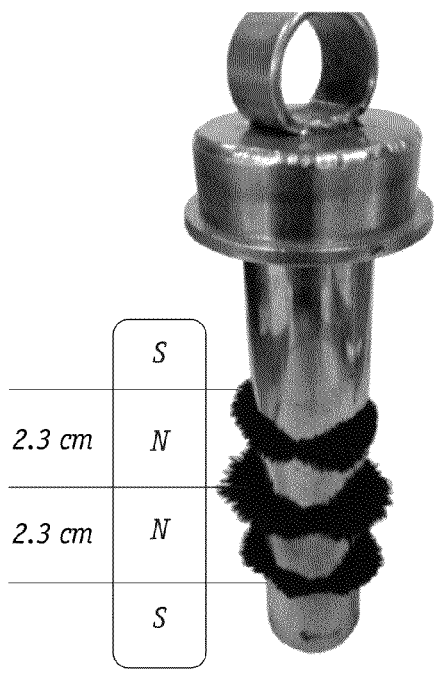

To compare the performance of the preferred magnetic bar assembly of FIG. 1C to that of the magnetic bar assembly of FIG. 1E, the same mass of $Fe_2O_3$ powder was placed on separate pieces of paper (5.5 cm by 10 cm). Each assembly with its associated sleeve was slowly rotated in non-contact fashion over the powder at a distance of 0.5 to 1.0 cm until essentially all the powder was pick up by attraction. As shown in FIG. 4A, almost the entire sleeve surface of the preferred magnetic bar assembly (FIGS. 1C and 3A) was covered with iron oxide powder. In contrast, as shown in FIG. 4B, the magnetic bar assembly of FIGS. 1E and 3B was able to attract iron powder onto a limited surface area of the sleeve surface where like poles met. As is apparent, the effective area of attraction is larger with the preferred magnetic bar assembly where the longitudinal axis of each magnetic bar is perpendicular to the central axis or length of the magnetic bar assembly.

As shown in FIG. 1A, a process stream entering filter housing 4 via line 6 initially travels through wire cage 28 and contacts the IPM packing substances while under the influence of a suitable magnetic field generated by the permanent magnetic bar assemblies 34. Solid paramagnetic particles in the process stream 6 will be attracted to sleeve holders 32 and to the IPM packing substances 36. Diamagnetic solids in the process stream 6 having magnetism induced by the IPM packing substances are also attracted to sleeve holder 32 and to IPM packing substances 36. Treated process stream passes through wire cage 28 and exits filter housing 4 through control valve 12 and line 10.

In the clean-up cycle, control valves 8 and 12 are closed in sequence. Cover plate 20 is opened and the entire core assembly, including permanent magnetic bar assemblies 34, top supporting plate 26 along with sleeve holders 32, wire cage 28 containing IPM packing substances 36, is withdrawn from filter housing 4. Thereafter, permanent magnetic bar assemblies 34 are withdrawn from the sleeve holders 32 to remove the magnetic field from the interior 14 thereby releasing the attracted solids of paramagnetic and diamagnetic substances from the outer surface of sleeve holders 32 and surfaces of the IPM packing. The core assembly is washed with water or other suitable fluid before the magnetic bar assemblies 34 are reinserted into sleeve holders 32. The cleaned core assembly is then re-positioned into filter housing 4 and the top opening is closed and sealed with cover plate 20 and the fitted gasket.

Before starting the operation cycle, control valves 46 and 48 are opened to briefly introduce high pressure fluid, such as water, process stream or air from line 47 to flush out the residual solids in filter housing 4, and to remove the flushed solids through control valve 48 and drain line 49. Finally, control valves 46 and 48 are closed and control valves 8 and 12 are opened to start the operation cycle again.

Figure 2A:
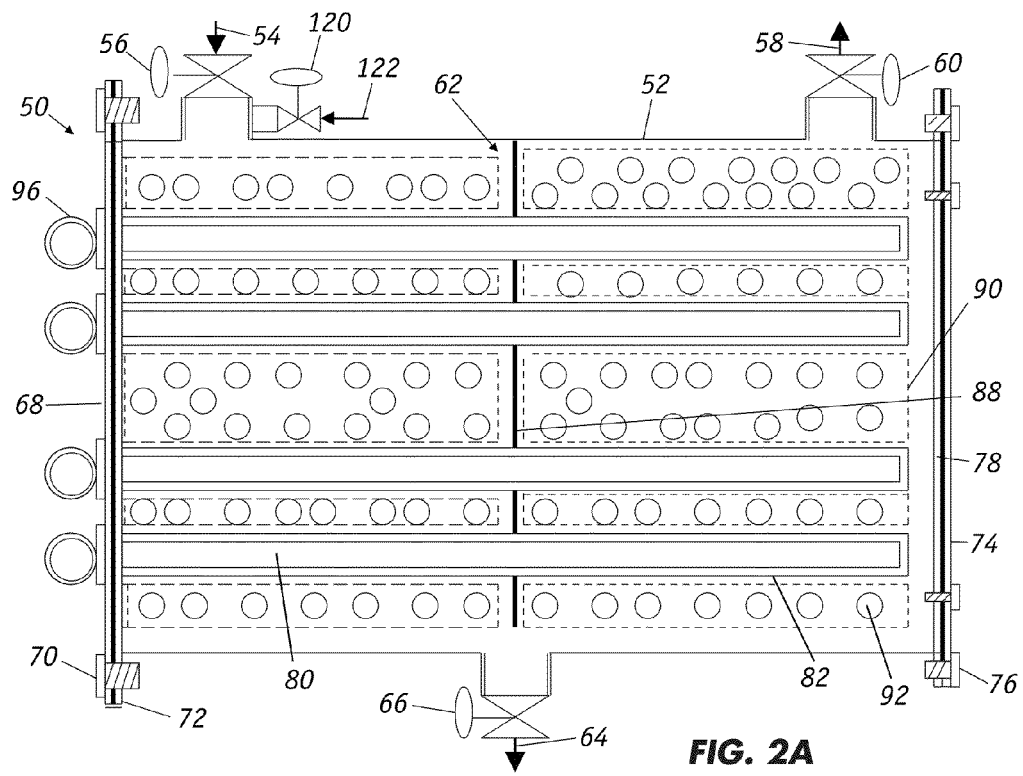
FIG. 2A and FIG. 2B are elevational and side cross sectional views, respectively, of an embodiment of a magnetic filter with inducement paramagnetic material packing, removable, horizontally oriented permanent magnetic bar assemblies, with FIG. 2B depicting a limited number of sleeve holders and packing material.

FIG. 2A depicts a horizontal filter 50 that comprises a housing 52 having an inlet pipe 54 that can be coupled to a contaminated process stream through control valve 56, an outlet pipe 58 from which a treated process stream exits through control valve 60. Housing 52 defines an interior region 62. Flow through drain pipe 64, which is welded to the bottom of housing 52, is regulated with control valve 66 which is normally closed during filtration operation and, is opened during clean-up service to discharge flush fluid from housing 52.

The left cover plate 68 is fastened, by bolts 70 to an annular flange 72 that is welded to the outer perimeter along left side opening of housing 52, while the right cover plate 74 is fastened, by bolts 76 to an annular flange 78 that is welded to the outer perimeter along right side opening of housing 52. A polymer gasket may be inserted between cover plates and flanges.

The filter assembly includes horizontal multiple permanent magnetic bar assemblies 80 that are removable from filter housing 52. Each bar assembly 80 fits into an elongated diamagnetic sleeve holder 82, which is constructed of a diamagnetic metal such as stainless steel 304SSL. Each of the sleeve holders 82 is sealed at one end and the open end is preferably welded to the fitted hole in cover plate 68 to form integral units therewith. To secure the position and support the weight of sleeve holders 82 and the magnetic bar assembly 80, each sleeve holder is fitted into a hole of the partition plate 88 which is welded to housing 52 to divide filter interior into two equal chambers. To induce the magnetism to solid diamagnetic substances in the process stream, wire cages 90 is filled with IPM packing substances 92 which are inserted into the space between the sleeve holders 82 from both sides of the filter openings. Wire cage 90, as a holder of IPM packing substances 92, is preferably made of coarse wire of diamagnetic substances with mesh size slightly smaller than the size of IPM packing substances 92 to prevent their loss to the process flow.

Preferred IPM packing substances and configurations are the same as those used in the vertically oriented magnetic filter 2 shown in FIG. 1A. The spacing between the exterior surfaces of adjacent sleeves 82 holding horizontally oriented magnetic bar assemblies 80 should be in the range from 0.1 to 5 cm, and preferably from 0.1 to 2 cm. The magnetic flux intensity in the filter should be 2,000 to 20,000 GS, preferably 2,000 to 10,000 GS, and more preferably 6,000 to 10,000 GS.

Figure 2B:
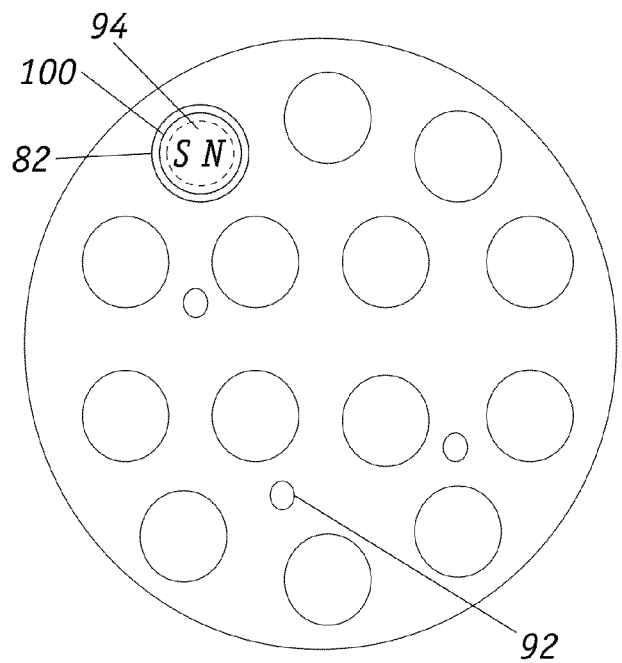
Figure 2C:
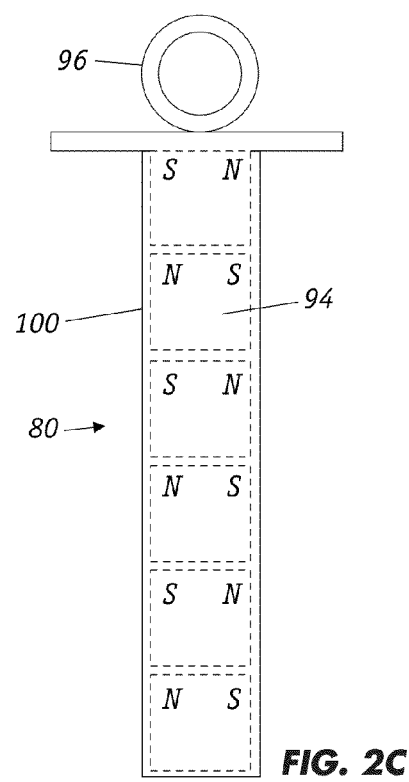
FIG. 2C is a cross sectional view of a permanent magnetic bar assembly.

As depicted in FIGS. 2B and 2C, casing 100 of each permanent magnetic bar assembly 80 is a diamagnetic metal such as stainless steel 304 SSL and defines a chamber that accommodates one or more magnet blocks to form a permanent magnetic bar assembly 80. Each permanent magnetic bar assembly 80 has a pulling ring 96 on top for withdrawing from sleeve holder 82 during clean-up cycle. A plurality of short magnet blocks 94 are stacked one on top of another and arranged so that each of the two poles of one magnet block is juxtaposed to an opposite pole of an adjacent magnet block.

FIG. 2B depicts the cross sectional lateral side view showing the fitted holes for the sleeve holder 82, and the IPM packing substance 92 which fills up the space between the sleeve holders.

The configuration of the magnetic filter 50 directs the process stream entering filter housing 52 via line 54 to flow downward in left chamber toward the bottom opening between partition plate 88 and filter housing 52. The process stream then flows upward in right chamber toward the exit and treated process stream exits filter housing 52 through control valve 60 and line 58. In both chambers of the filter, the process stream travels through the outer surfaces of sleeve holders 82, and the wire cage 90 contacting the IPM packing substances 92 under influence of a strong magnetic field generated by the permanent magnetic bar assemblies 80. Solid paramagnetic substances in the process stream 54 will be attracted to the outer surfaces of sleeve holders 82, and to the surfaces of IPM packing substances 92. Diamagnetic solids in the process stream 54 having magnetism induced by the IPM packing substances will be attracted to outer surfaces of sleeve holders 82 and to the surfaces of IPM packing substances 92.

In the clean-up cycle, permanent magnetic bar assemblies 80 are withdrawn from the sleeve holders 82 from the filter to remove the magnetic field from interior space 62 of the filter, releasing the attracted solids of paramagnetic and diamagnetic substances from the outer surfaces of sleeve holders 82 and surfaces of the IPM packing 92. After control valves 56 and 60 are closed, control valves 66 and 120 are opened to introduce high pressure fluid via line 122, such as water, process stream or air to flush out the released solids through control valve 66 and drain line 64. To start the operation cycle, magnetic bar assemblies 80 are replaced into sleeve holders 82, control valves 66 and 120 are closed and control valves 60 and 56 are opened in sequence.

The magnetic filters of the present invention are particularly suited for abatement programs to remove airborne contaminants especially particles that are 0.1 nm to 1.0 mm in size, such as particulate matter PM 2.5. Both diamagnetic and paramagnetic particles can be removed from the streams. For example, filters can be installed in clean room operations or in airplanes to clean recirculated air, in electric power plant or steel mill to clean up flue gas, or in mobile emission sources, such as cars to reduce air pollution. The magnetic filters can also be employed to remove diamagnetic particles in liquid streams in refineries, chemical plants and other facilities in continuous operations where particles in process streams can accumulate and damage equipment. For instance, inorganic catalysts, that become free flowing or otherwise detached from a catalyst bed, can be effectively removed from streams with the inventive magnetic filter. Furthermore, this filter can be installed in ultra-pure water production facility to remove the ultra-fine diamagnetic and paramagnetic particles from the product stream. Similarly, a filter can be positioned upstream of a natural gas treatment plant to remove ultra-fine diamagnetic particles, such as sand, carbon residual, and diamagnetic metal oxides, and ultra-fine paramagnetic particles, such iron sulfide, iron oxides, etc., from a natural gas stream at the gas field in order to protect plant equipment and improve plant efficiency.

EXAMPLES

The following examples are presented to further illustrate different aspects and embodiments of the invention and are not to be considered as limiting the scope of the invention. To demonstrate the interaction between paramagnetic and diamagnetic substances under the influence of an external magnetic field generated by permanent magnets, paramagnetic and diamagnetic powders were selected for various experiments. The substances are classified into paramagnetic and diamagnetic based on their mass susceptibilities (MS).

Mass susceptibility is the magnetic susceptibility of a substance per gram and magnetic susceptibility is the magnetization of a material per unit applied field. It describes the magnetic response of a substance to an applied magnetic field. All substances are characterized by mass susceptibility (MS) values. Paramagnetic substances have higher and positive MS values whereas diamagnetic substances have lower or negative MS values. Table 1 lists the MS values of selected substances.

TABLE 1

Mass Susceptibility of Substances

| Substance | Mass Susceptibility ($10^{-6}$ c.g.s. units) |
|---|---|
| Aluminum oxide ($Al_2O_3$) | −37.0 |
| Carbon, diamond (C) | −5.9 |
| Carbon, graphite (C) | −6.0 |
| Cerium | +5,160 |
| Cesium oxide ($CsO_2$) | +1,534 |
| Chromium (Cr) | +180 |
| Chromium oxide $Cr_2O_3$ | +1,960 |
| Cobalt (Co) | +4,900 |
| Cobalt oxide (CoO) | +4,900 |
| Cupper oxide (CuO) | +260 |
| Dysprosium oxide ($Dy_2O_3$) | +89,600 |
| Gadolinium oxide ($Gd_2O_3$) | +53,200 |
| Iron (Fe); Iron oxide (FeO) | +7,200 |
| Iron oxide (red) ($Fe_2O_3$) | +3,586 |
| Iron sulfide (FeS) | +1,074 |
| Iron Sulfate ($FeSO_4$) | +12,400 |
| Iron Chloride ($FeCl_3$) | +13,450 |
| Manganese (Mn-alpha) | +529 |
| Manganese (Mn-beta) | +483 |
| Nickel (Ni); Nickel oxide (NiO) | +660 |
| Nickel sulfide (NiS) | +190 |
| Potassium oxide ($KO_2$) | +3,230 |
| Palladium (Pd) | +567 |
| Platinum (Pt) | +202 |
| Rhodium (Rh) | +110-123 |
| Rhodium oxide ($Rh_2O_3$) | +104 |
| Silicon (Si) | −3.9 |
| Silicon carbide (SiC) | −12.8 |
| Silicon oxide ($SiO_2$) | −29.6 |
| Titanium (Ti) | +150-153 |
| Titanium oxide ($TiO_2$) | +5.9 |
| Vanadium (V) | +255 |
| Vanadium oxide ($V_2O_3$) | +1,976.0 |
| Water ($H_2O$) | −7.2 |
| Zinc (Zn) | −11.4 |
| Zinc oxide (ZnO) | −46.0 |

Example 1

The degree or strength of magnetism exhibited by selected solid substances with high MS values in a magnetic field was measured. A permanent magnetic bar assembly with a magnetic strength of 6,000 GS was employed. The selected solid powders were: cobalt (Co), iron (Fe), nickel (Ni), nickel oxide (NiO), iron oxides (FeO and $Fe_2O_3$), iron sulfate ($FeSO_4$), iron chloride ($FeCl_3$), Ni supported on γ-alumina catalyst (Ni/γ$Al_2O_3$), dysprosium oxide ($Dy_2O_3$), gadolinium oxide ($Gd_2O_3$), and chromium oxide ($Cr_2O_3$).

For each test, approximately 0.5 grams of powder were weighed by a precision balance (to $10^{-4}$ grams) and placed into a (precision weighed) glass vessel. The permanent magnetic bar assembly was then placed near the powder. After attracting of the power, the magnetic bar was removed and the vessel with residual powders (if any) was weighed. Weight percent (%) of the powders attracted by magnetic bar was calculated.

As shown in the data set forth in Table 2, metals and their oxides with MS values of approximately 600 to 7,000×10$^{-6}$ c.g.s. unit are readily attracted by the permanent magnetic bar assembly, except for NiO (no attraction) and $Cr_2O_3$ (only 82%). As expected, $Dy_2O_3$ and $Gd_2O_3$ with their very high susceptibilities showed complete attraction. Surprisingly, however, even with very high MS values (over +10,000×10$^{-6}$), iron sulfate ($FeSO_4$) and iron chloride ($FeCl_3$) showed no magnetism and were not attracted by the MB. This experiment suggests that mass susceptibility serves only a guideline for selecting suitable inducement paramagnetic materials. Metals or metal oxides are possible candidates as suitable inducing paramagnetic substances while metal salts such as $FeSO_4$ or $FeCl_3$ are excluded from the consideration, despite of their high MS values.

TABLE 2

Permanent paramagnetic bar strength: 6000 GS
para-magnetic

| | Vessel (g) | Powder (g) | Vessel after attraction (g) | Powder attracted by MB (g) | % Powder attracted by MB (g) |
|---|---|---|---|---|---|
| Co | 21.7539 | 0.5001 | 21.7555 | 0.4985 | 99.68 |
| Fe | 23.347 | 0.5067 | 23.347 | 0.5067 | 100.00 |
| Ni | 23.3185 | 0.506 | 23.3185 | 0.5060 | 100.00 |
| FeO | 23.2832 | 0.5046 | 23.2844 | 0.5034 | 99.76 |
| NiO | 22.9339 | 0.5038 | 23.4376 | 0.0001 | 0.02 |
| $FeCl_3$ | | | | | 0.00 |
| $FeSO_4$ | | | | | 0.00 |
| $Fe_2O_3$ | 21.3278 | 0.5044 | 21.3284 | 0.5038 | 99.88 |
| Ni/γ$Al_2O_3$ | 21.3745 | 0.5025 | 21.3745 | 0.5025 | 100.00 |
| $Dy_2O_3$ | 21.7519 | 0.5023 | 21.7549 | 0.4993 | 99.40 |
| $Cr_2O_3$ | 23.2467 | 0.5012 | 23.3347 | 0.4132 | 82.44 |
| $Gd_2O_3$ | 23.3186 | 0.5006 | 23.3186 | 0.5006 | 100.00 |

Example 2

This experiment confirmed that diamagnetic substances by themselves are not attracted to a magnetic bar. The diamagnetic substances tested were silicon, silicon carbide (SiC), γ-alumina (γ$Al_2O_3$), non-magnetic butadiene, titanium oxide ($TiO_2$), ceramic, activated carbon, polyethylene, and elemental sulfur. Magnetic butadiene was also tested. A permanent magnetic bar assembly with a magnetic strength of 6,000 GS was positioned next to powder samples; none of the powders was attracted onto the magnetic bar, except the magnetic butadiene (containing paramagnetic substance). The presence of the magnetic field did not induce magnetism in the diamagnetic materials.

Example 3

Simply coating a permanent magnetic bar assembly with a paramagnetic substance does not render the assembly attractive to diamagnetic materials. In this example, the permanent magnetic bar assembly coated with iron oxide (FeO) powder was positioned each of various diamagnetic powders that included Si, SiC, $SiO_2$. $Al_2O_3$, non-magnetic butadiene, magnetic butadiene, $TiO_2$, ceramics, activated carbon, and polyethylene. None of the diamagnetic powders was attracted by permanent magnetic bar assembly, except for the magnetic butadiene which contained a paramagnetic substance.

Example 4

In mixing a diamagnetic substance with a suitable IPM substance, the paramagnetic substance acts as a magnetic inducing agent. The diamagnetic substance in the mixture exhibits magnetism when the mixture is exposed to a magnetic field that is created by a permanent magnetic bar or electromagnetic. Both the paramagnetic and diamagnetic substances in the mixture are attracted to the magnet.

Experiments were performed in air (gas phase) at ambient conditions. For each test, approximately 1.0 gram of diamagnetic powders and 0.1 grams of paramagnetic powders were weighed by a precision balance (to 10$^{-4}$ grams) and the mixture was placed into a precision weighed glass vessel. A permanent magnetic bar assembly with magnetic power of 6,000 GS was position adjacent the mixture to attract powders from the vessel. The magnet was removed and the vessel with residual mixed powders was weighed. The weight percent (%) of the mixed powders attracted by the magnet; the data is summarized in Tables 3 and 4.

TABLE 3

Permanent paramagnetic bar strength: 6000 GS
Diamagnetic Material (DM):Ni/γ$Al_2O_3$
(PM powder) = 10:1

| | Vessel (g) | DM (g) | Ni/γAl2O3 (g) | Vessel after MB attraction (g) | DM + Ni/γ $Al_2O_3$ attracted by MB (g) | % attracted by MB |
|---|---|---|---|---|---|---|
| γ $Al_2O_3$ | 22.8674 | 1.0048 | 0.1024 | 23.9014 | 0.0732 | 6.61 |
| Si | 23.2828 | 1.0005 | 0.1014 | 23.3942 | 0.9905 | 89.89 |
| SiC | 22.9324 | 1.0018 | 0.1048 | 23.9704 | 0.0686 | 6.20 |
| RFCC | 21.3282 | 1.0013 | 0.1028 | 22.3216 | 0.1107 | 10.03 |
| S | 21.3285 | 1.0027 | 0.1009 | 22.2885 | 0.1436 | 13.01 |
| Activated Carbon | 21.3604 | 1.0008 | 0.1008 | 22.3683 | 0.0937 | 8.51 |

As set forth in Table 3, with Ni/γ$Al_2O_3$ as the inducing agent, the magnetic bar showed only mild attractions for γ $Al_2O_3$, SiC, resid fluid cracking catalyst (RFCC-$Al_2O_3$/$SiO_2$: 70/30), elemental sulfur (S), and activated carbon, but exhibited a significantly higher attraction for silicon.

TABLE 4

Permanent paramagnetic bar strength: 6000 GS
Diamagnetic Material:FeO (PM powder) = 10:1

| | Vessel (g) | DM (g) | FeO (g) | Vessel after MB attraction (g) | DM + FeO attracted by MB(g) | % attracted by MB |
|---|---|---|---|---|---|---|
| γ $Al_2O_3$ | 21.7532 | 1.0047 | 0.102 | 21.989 | 0.8709 | 78.69 |
| Si | 23.2471 | 1.0032 | 0.1034 | 23.3912 | 0.9625 | 86.98 |
| SiC | 23.319 | 1.0015 | 0.1052 | 23.4359 | 0.9898 | 89.44 |
| RFCC | 22.8697 | 1.004 | 0.1065 | 22.955 | 1.0252 | 92.32 |
| S | 23.282 | 1.0013 | 0.1044 | 23.4632 | 0.9245 | 83.61 |
| Activated Carbon | 23.2832 | 1.0012 | 0.1043 | 23.3733 | 1.0154 | 91.85 |

As set forth in table 4, FeO is a better inducing agent than Ni/γ$Al_2O_3$ since the magnetic bar attracted a much higher percentage of the paramagnetic and diamagnetic mixtures.

Example 5

This experiment is similar to that of Example 4 except that an IPM in the form of thin carbon steel wires (CSW) was used instead of iron powder. As shown in Table 5, 70 to nearly 100% of the diamagnetic substance were attracted by the magnet, except in the case the elemental sulfur.

TABLE 5

Permanent paramagnetic bar strength: 6000 GS
Diamagnetic Material (DM):Carbon Steel Wire (CSW)
(PM substance) = 10:5

|  | Vessel (g) | DM (g) | CSW (g) | Vessel after MB attraction (g) | DM + CSW attracted by MB (g) | % attracted by MB |
|---|---|---|---|---|---|---|
| $\gamma Al_2O_3$ | 21.7529 | 1.0062 | 0.5057 | 22.203 | 1.0618 | 70.23 |
| Si | 23.2464 | 1.0031 | 0.5071 | 23.2854 | 1.4712 | 97.42 |
| SiC | 23.3189 | 1.0029 | 0.5038 | 23.4808 | 1.3448 | 89.25 |
| RFCC | 22.8686 | 1.0064 | 0.5035 | 23.2035 | 1.1750 | 77.82 |
| S | 21.3598 | 1.0012 | 0.1023 | 22.3472 | 0.1161 | 10.52 |
| Activated Carbon | 23.2827 | 1.003 | 0.5011 | 23.6792 | 1.1076 | 73.64 |

Example 6

Liquid phase testing was conducted at ambient conditions. Specifically, for each test, approximately 50 grams of water were mixed with 1.0 gram diamagnetic powder in a precision weighed vessel. Thereafter, paramagnetic powder was added into the mixture. A permanent magnetic bar assembly, with a magnetic power of 6,000 GS, was inserted into the liquid mixture, allowing the suspended solid powders to be attracted by the magnet. The magnet was removed and solid powders scrapped off and the cleaned magnet was reinserted into the solvent and allowed to attract additional powder. After removing the magnet the second time, the vessel with the solution containing the residual powders was weighed. The weight percent (%) of the mixed powders attracted by magnet was calculated.

Table 6 are the results for testing using water as the solvent, RFCC powder (equilibrium resid fluid cracking catalyst ($SiO_2/Al_2O_3$: 7/3) as the diamagnetic material (DM), and $Fe_2O_3$ as the IPM. Approximately 0.1, 0.3, 0.5, and 0.7 grams of $Fe_2O_3$ were added in each instance and the results show that 60 to nearly 100% of the mixed powders was attracted by the magnet, depending upon the amount of $Fe_2O_3$ added and the position of the magnet (related to magnetic strength). The amount of powder attracted was proportional to the amount of $Fe_2O_3$ added to the mixture.

TABLE 6

Permanent Magnet Bar (MB) Strength: 6,000 GS

| Vessel (g) | Solution (g) | DM (g) | $Fe_2O_3$ (g) | Vessel/ Solution after attraction by MB (g) | DM + $Fe_2O_3$ attracted by MB | % attracted by MB |
|---|---|---|---|---|---|---|
| Water:RFCC:$Fe_2O_3$ = 50:1:0.1 | | | | | | |
| 12.0105 | 50.0064 | 1.0005 | 0.1011 | 62.1254 | 0.9931 | 90.15 |
| Water:RFCC:$Fe_2O_3$ = 50:1:0.3 | | | | | | |
| 11.9915 | 50.2518 | 1.001 | 0.3061 | 62.3449 | 1.2055 | 92.23 |
| Water:RFCC:$Fe_2O_3$ = 50:1:0.5 | | | | | | |
| 11.9744 | 50.428 | 1.0168 | 0.5008 | 62.5725 | 1.3475 | 88.79 |

TABLE 6-continued

Permanent Magnet Bar (MB) Strength: 6,000 GS

| Vessel (g) | Solution (g) | DM (g) | $Fe_2O_3$ (g) | Vessel/ Solution after attraction by MB (g) | DM + $Fe_2O_3$ attracted by MB | % attracted by MB |
|---|---|---|---|---|---|---|
| Water:RFCC:$Fe_2O_3$ = 50:1:0.7 | | | | | | |
| 11.9824 | 50.4629 | 1.0381 | 0.7024 | 62.4704 | 1.7154 | 98.56 |

Example 7

This experiment was similar to that of Example 6 except diesel was the solvent. The results as set forth in Table 7 demonstrate that approximately 39 to 92% of the mixed solid powders was attracted by the magnet with the amount of powder in diesel attracted by the magnet was proportional to the amount of $Fe_2O_3$ added to the mixture with one exception.

TABLE 7

Permanent Magnet Bar (MB) Strength: 6,000 GS

| Vessel (g) | Solution (g) | DM (g) | $Fe_2O_3$ (g) | Vessel/ Solution after attraction by MB (g) | DM + $Fe_2O_3$ attracted by MB | % attracted by MB |
|---|---|---|---|---|---|---|
| Diesel:RFCC:$Fe_2O_3$ = 50:1:0.1 | | | | | | |
| 11.9753 | 50.1911 | 1.0013 | 0.1025 | 62.6677 | 0.6025 | 54.58 |
| Diesel:RFCC:$Fe_2O_3$ = 50:1:0.3 | | | | | | |
| 11.9917 | 50.0825 | 1.0047 | 0.3017 | 62.3252 | 1.0554 | 80.79 |
| Diesel:RFCC:$Fe_2O_3$ = 50:1:0.5 | | | | | | |
| 11.9192 | 50.0838 | 1.0335 | 0.5085 | 62.4436 | 1.1014 | 71.43 |
| Diesel:RFCC:$Fe_2O_3$ = 50:1:0.7 | | | | | | |
| 12.0006 | 50.1219 | 1.0009 | 0.7034 | 62.2536 | 1.5732 | 92.31 |

Example 8

This experiment demonstrates that the magnetic strength of the 6000 GS permanent magnets employed in the above examples decreased exponentially (with $10^4$ power) with distance from a magnet. The magnetic field strength of the permanent magnet was measured at increments from 0 to 5.00 cm distances. The results as shown in Table 8 illustrate the substantial decay of its magnetic strength. It is expected that electromagnetic bars will exhibit similar decay. With the present invention, the strength of the magnetic field generated by the magnets must be strong enough to activate the inducing paramagnetic substances to magnetize the diamagnetic substances as the diamagnetic and inducing paramagnetic substances interact. Given that magnetic strength decays dramatically with distance, it is necessary to keep the distance between sleeve holders to a relatively small gap as discussed previously.

TABLE 8

| | Distance (cm) | | | | | | | | | | | |
|---|---|---|---|---|---|---|---|---|---|---|---|---|
| | 0 | 0.50 | 0.75 | 1.00 | 1.25 | 1.50 | 1.75 | 2.00 | 2.25 | 2.50 | 3.00 | 5.00 |
| Mag. Field St. (GS) | 6000 | 1000 | 600 | 250 | 110 | 75 | 43 | 40 | 20 | 15 | 10 | 1 |

Example 9

With the present invention, in order to function as an effective magnetic filter to remove diamagnetic materials, the filter must use magnets, which can be permanent magnets or electromagnets, capable of generating sufficient magnetic fields to impart or induce the requisite magnetism in the diamagnetic materials so as to be attracted by a magnetic field. The intensity of the induced magnetism in the diamagnetic materials must to be strong enough to cause the attraction by the magnetic field. To demonstrate the importance of the magnetic field strength, 2,000 GS and 6,000 GS permanent magnetic bars were compared in a test similar to that in Example 6 where the magnets removed RFCC powders in water solution at room temperature.

The results are as summarized in Table 9 show that with the 2,000 GS magnet, only about 40% of the mixed powder was attracted. The amount of paramagnetic powder present in the solution did not affect the level of attraction. In contrast, with the 6,000 GS magnet, 90% and 92% of the mixed powder was removed under a PM/DM ratio of 0.1 and 0.3, respectively. Therefore, it is preferred to use magnets with higher magnetic strength to attract the diamagnetic substances through induced magnetism by the paramagnetic substances. The influence of the amount of paramagnetic powder present in the solution was comparatively less important with respect to the diamagnetic material being attracted.

TABLE 9

Permanent Magnet Bar (MB) Strength: 2,000 and 6,000 GS

| | para-magnetic | % attracted by MB |
|---|---|---|
| 2000 GS | | |
| Water:RFCC:para-magnetic = 50:1:0.1 | Fe2O3 | 38.52 |
| Water:RFCC:para-magnetic = 50:1:0.3 | Fe2O3 | 44.43 |
| 6000 GS | | |
| Water:RFCC:para-magnetic = 50:1:0.1 | Fe2O3 | 90.15 |
| Water:RFCC:para-magnetic = 50:1:0.3 | Fe2O3 | 92.23 |

What is claimed is:

1. A method of removing diamagnetic material from a carrier stream that comprises the steps of:
   (a) contacting a carrier stream comprising a carrier fluid and a diamagnetic material to an inducement paramagnetic material within a region; and
   (b) establishing a magnetic field within the region thereby rendering the diamagnetic material sufficiently magnetic so as to be attracted by a magnet to a yield a cleaned carrier fluid with reduced levels of the diamagnetic material.

2. The method of claim 1 wherein the inducement paramagnetic material is a substance made of a paramagnetic material and in step (b) the diamagnetic material is also attracted to the inducement paramagnetic material.

3. The method of claim 1 wherein the inducement paramagnetic material is a substance that is selected from the group of paramagnetic materials consisting of Ce, $CeO_2$, $CsO_2$, Co, CoO, Ni, CuO, NiO, NiS, Fe, FeO, $Fe_2O_3$, FeS, Mn, Ni/$\gamma Al_2O_3$, $Cr_2O_3$, $Dy_2O_3$, $Gd_2O_3$, Ti, V, $V_2O_3$, Pd, Pt, Rh, $Rh_2O_3$, $KO_2$, and mixtures thereof.

4. The method of claim 1 wherein the inducement paramagnetic material is a substance that is selected from the group of paramagnetic materials consisting of Co, CoO, Ni, Fe, FeO, $Fe_2O_3$, FeS, Ni/$\gamma Al_2O_3$, $Cr_2O_3$, $Dy_2O_3$, $Gd_2O_3$, and mixtures thereof.

5. The method of claim 1 wherein the diamagnetic material comprises particles having a size in the range of 0.1 nm to 1.0 mm.

6. The method of claim 1 wherein the diamagnetic material is selected from the group consisting of silicon, silicon carbide (SiC), γ-alumina ($\gamma Al_2O_3$), silica ($SiO_2$), silica/alumina ($SiO_2$ $Al_2O_3$), non-magnetic butadiene, magnetic butadiene, titanium oxide ($TiO_2$), ceramic, activated carbon (C), polyethylene, and elemental sulfur, and mixtures thereof.

7. The method of claim 1 wherein the carrier stream includes a paramagnetic material and in step (b) the paramagnetic material is attracted to the magnet and to the inducement paramagnetic substance.

8. The method of claim 7 wherein the carrier fluid is natural gas and the diamagnetic materials comprise sand, carbon residual, and diamagnetic metal oxides, and the paramagnetic materials comprise iron sulfide and iron oxides.

9. The method of claim 1 comprising step (c) of removing the magnetic field from the region whereupon the diamagnetic material is released from the magnet.

10. The method of claim 1 wherein the carrier fluid is air and the diamagnetic material comprises pollutants.

11. The method of claim 1 wherein the carrier fluid comprises flue gasses from an electric power plant or steel mill and the diamagnetic material comprises airborne particles that include carbon, metal oxides and/or metal sulfide.

12. The method of claim 1 wherein the carrier fluid comprises automobile exhaust and the diamagnetic material comprises airborne carbon particles.

13. The method of claim 1 wherein the carrier stream comprises a liquid stream in a refinery or chemical plant.

14. The method of claim 1 wherein the carrier fluid is water and the diamagnetic material comprises pollutants.

15. The method of claim 1 wherein the region has a magnetic flux intensity of from 2,000 to 20,000 GS.

16. The method of claim 1 wherein step (b) employs magnets to generate the magnetic field and the paramagnetic inducing substance is not in physical contact with the magnets.

17. The method of claim 1 wherein step (b) employs a plurality of elongated non-magnetic sleeves that are spaced apart from each other with each sleeve configured to accommodate one or more magnets that are disposed therein.

18. The method of claim 17 wherein each sleeve has an exterior surface and the distance between adjacent exterior surfaces of adjacent sleeves is from 0.1 to 5 cm.

19. The method of claim 17 wherein each sleeve has a central axis and accommodates a plurality magnets wherein each magnet has a north pole and a south pole and a longitudinal axis that is perpendicular to the central axis.

20. The method of claim 17 wherein the plurality of magnets are in a staggered arrangement with opposite poles of adjacent magnets juxtaposed.

21. The method of claim 17 wherein each sleeve has a central axis and accommodates a plurality of arrays of magnets wherein each array comprises two or more magnets wherein each magnet has a north pole and a south pole and a longitudinal axis that is perpendicular to the central axis and the magnets in each array have like poles juxtaposed.

22. A magnetic filter for separating diamagnetic contaminants from a carrier stream that comprises:
    a housing having (i) a stream inlet, (ii) a stream outlet and (iii) an interior region between the inlet and outlet;
    inducement paramagnetic packing materials distributed within the interior region wherein the inducement paramagnetic packing materials are configured to come into physical contact with the diamagnetic contaminants; and
    a magnet disposed within the interior region to generate a magnetic field sufficient to render the inducement paramagnetic packing material magnetic.

23. The magnetic filter of claim 22 wherein the inducement paramagnetic packing materials are selected from the group of paramagnetic materials consisting of Ce, $CeO_2$, $CsO_2$, Co, CoO, Ni, CuO, NiO, NiS, Fe, FeO, $Fe_2O_3$, FeS, Mn, Ni/$\gamma Al_2O_3$, $Cr_2O_3$, $Dy_2O_3$, $Gd_2O_3$, Ti, V, $V_2O_3$, Pd, Pt, Rh, $Rh_2O_3$, $KO_2$, and mixtures thereof.

24. The magnetic filter of claim 22 wherein the inducement paramagnetic packing materials are selected from the group of paramagnetic materials consisting of Co, CoO, Ni, Fe, FeO, $Fe_2O_3$, FeS, Ni/$\gamma Al_2O_3$, $Cr_2O_3$, $Dy_2O_3$, $Gd_2O_3$, and mixtures thereof.

25. The magnetic filter of claim 22 wherein the region has a magnetic flux intensity of from 2,000 to 20,000 GS.

26. The magnetic filter of claim 22 wherein the inducement paramagnetic packing materials are not in physical contact with the magnet.

27. The magnetic filter of claim 22 comprising a plurality of elongated non-magnetic sleeves that are spaced apart from each other with each sleeve configured to accommodate one or more magnets that are disposed therein.

28. The magnetic filter of claim 27 wherein each sleeve has an exterior surface and the distance between adjacent exterior surfaces of adjacent sleeves is from 0.1 to 5 cm.

29. The magnetic filter of claim 27 wherein each sleeve has a central axis and accommodates a plurality magnets wherein each magnet has a north pole and a south pole and a longitudinal axis that is perpendicular to the central axis.

30. The magnetic filter of claim 29 wherein the plurality of magnets are in a staggered arrangement with opposite poles of adjacent magnets juxtaposed.

31. The magnetic filter of claim 27 wherein each sleeve has a central axis and accommodates a plurality of arrays of magnets wherein each array comprises two or more magnets wherein each magnet has a north pole and a south pole and a longitudinal axis that is perpendicular to the central axis and the magnets in each array have like poles juxtaposed.

32. The magnetic filter of claim 27 wherein the one or more magnets in each elongated non-magnetic sleeve are encased in a non-magnetic tubular enclosure that is sealed at one end and the tubular enclosure is slidably received within the elongated sleeve.

33. The magnetic filter of claim 27 wherein the carrier stream flows through the interior region in a substantially axial direction parallel to the plurality of elongated non-magnetic sleeves.

34. The magnetic filter of claim 27 wherein the carrier stream flows through the interior region in a substantially axial direction perpendicular to the plurality of elongated non-magnetic sleeves.

* * * * *